US006416684B1

(12) United States Patent
Bloomer

(10) Patent No.: US 6,416,684 B1
(45) Date of Patent: *Jul. 9, 2002

(54) ANTI-FREEZING AND DEICING COMPOSITION AND METHOD

(75) Inventor: Todd A. Bloomer, Georgetown, KY (US)

(73) Assignee: Grain Processing Corp, Muscatine, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/892,106

(22) Filed: Jun. 26, 2001

(51) Int. Cl.$^7$ ................................................ C09K 3/18
(52) U.S. Cl. .......................................... 252/70; 106/13
(58) Field of Search ............................... 252/70; 106/13

(56) References Cited

U.S. PATENT DOCUMENTS

| | | | |
|---|---|---|---|
| 2,716,068 A | 8/1955 | Fain et al. | |
| 4,223,129 A | 9/1980 | Roth et al. | |
| 4,329,449 A | 5/1982 | Roth et al. | |
| 4,439,337 A | 3/1984 | Nimerick et al. | |
| 4,448,702 A | 5/1984 | Kaes | |
| 4,501,775 A | 2/1985 | Parks et al. | |
| 4,664,832 A | 5/1987 | Sandvig et al. | |
| 4,668,416 A | 5/1987 | Neal | |
| 4,676,918 A * | 6/1987 | Toth et al. | 252/70 |
| RE32,477 E | 8/1987 | McConnell | |
| 4,698,173 A | 10/1987 | Hansen | |
| 4,746,449 A | 5/1988 | Peel | |
| 4,960,531 A | 10/1990 | Connor et al. | |
| 5,482,639 A | 1/1996 | Archer et al. | |
| 5,635,101 A * | 6/1997 | Janke et al. | 252/70 |
| 5,639,319 A * | 6/1997 | Daly | 152/450 |
| 5,709,812 A * | 1/1998 | Janke et al. | 252/70 |
| 5,709,813 A * | 1/1998 | Janke et al. | 252/70 |
| 5,772,912 A | 6/1998 | Lockyer et al. | |
| 5,849,356 A | 12/1998 | Gambino et al. | |
| 5,863,973 A | 1/1999 | Carder et al. | |
| 5,876,621 A | 3/1999 | Sapienza | |
| 5,965,058 A * | 10/1999 | Janke et al. | 252/70 |
| 5,980,774 A | 11/1999 | Sapienza | |
| 6,080,330 A * | 6/2000 | Bloomer | 252/70 |
| 6,129,857 A * | 10/2000 | Sapienza | 272/70 |
| 6,299,793 B1 * | 10/2001 | Hartley et al. | 252/70 |

FOREIGN PATENT DOCUMENTS

JP    2 202574    8/1990

OTHER PUBLICATIONS

Chemical Abstract No. 105:80842, abstract of Japanese Patent Specification No. 61–053382 (Mar. 1986).*
Chemical Abstract No. 123:59562, abstract of Hungarian Patent Specification No. 65997 (Aug. 1994).*

* cited by examiner

Primary Examiner—Anthony J. Green
(74) Attorney, Agent, or Firm—Leydig, Voit & Mayer Ltd.

(57) ABSTRACT

A composition is proposed for use in preventing the formation of ice or snow on outdoor surfaces, such as roadways or aggregate stockpiles, and also for deicing surfaces upon which snow or ice has formed. The composition is formed from a waste product of the process of removing sugar from molasses, also known as desugared molasses. As a byproduct of a widely used process for making edible sugar, the desugared molasses is readily available at a low cost. Moreover, the composition is ready for use in conventional spraying equipment without the need for mixing agents, is environmentally friendly, and is able to perform at temperatures well below the freezing point of water. The composition is also non-corrosive and can be admixed with chloride salts, such as magnesium, calcium, or sodium chloride, to reduce the corrosiveness of the resulting solution while still providing effective deicing activity.

38 Claims, No Drawings

ANTI-FREEZING AND DEICING COMPOSITION AND METHOD

TECHNICAL FIELD

The present invention relates generally to a composition and related method for preventing the accumulation of snow or ice on a surface or object and/or the deicing of surfaces or objects on which snow or ice has already accumulated.

BACKGROUND OF THE INVENTION

Many compounds are known as being helpful in removing snow and ice from surfaces, such as roadways or aggregate stockpiles of sand, gravel and coal, or to prevent ice and snow from forming on such surfaces. The compounds most prevalently used in the past were common types of chloride salts, such as calcium, magnesium, or sodium chloride. These compounds have long been accepted as the most efficient and cost effective manner of preventing the accumulation of snow and ice, or deicing surfaces upon which snow or ice has accumulated. However, there are several well-recognized limitations and detrimental effects resulting from the use of chloride salts.

One significant limitation is that chloride salts are effective as anti-freezing or deicing agents only at temperatures just below freezing, or to about 20° F. In the depths of winter, many climates in the United States frequently experience temperatures much lower than this for long periods of time. Such low temperatures will render such compounds ineffective and, thus, unsuitable for use as intended.

Additionally, the use of large amounts of chloride salts in snow or ice removal has long been recognized as being harmful to the environment. After spreading, the salts admix with the melting ice or snow. The runoff from this process can contaminate both above and below ground water supplies and harm plants or other materials that corrode or deteriorate when placed in contact with high concentrations of chloride salts.

An early proposal for overcoming these problems was made by Dr. Jeno Toth of Hungary. Legend has it that Dr. Toth observed that even at temperatures well below freezing, snow and ice did not form on outdoor surfaces near where commercial plants discharged waste products resulting from alcohol distillation processes. Thus, after experimentation, he proposed the use of these distillation byproducts as alternatives to chloride salts as anti-freezing and deicing agents. A description of his experimentation with these compounds is found in U.S. Pat. No. 4,676,918, issued June 30, 1987.

Later proposals seeking to diversify from Dr. Toth's work propose the use of similar types of byproducts as anti-freezing or deicing agents. For example, U.S. Pat. Nos. 5,709,813, 5,709,812, and 5,635,101, all to Janke et al., propose the use of the waste byproducts of the wet corn milling, wine, and cheese-making processes as anti-freezing and deicing agents. While the compositions forming these byproducts serve as effective anti-freezing and deicing agents, several limitations remain.

First, many of the compositions proposed in these patents take on the consistency of "thick molasses" at low temperatures and at extremely low temperatures (e.g. below 0° F.), become thick and putty-like. In this form, the compounds can only be effectively spread onto surfaces for use if first placed in solution with water or other compounds, such as known prior art chemical deicing agents. While it is feasible to do so to form an improved anti-freezing/deicing solution, it has been observed that such a solution continues to be high in the concentration of suspended solids and, thus, tends to clog conventional spraying or spreading devices. Such clogging can result in poor or inadequate spreading over the surface/object to be treated and thus ineffective performance. Still further, significant downtime may be necessary to clean the sprayers used to apply the composition. This costly and labor intensive operation is often quite difficult when out on the job away from repair facilities and appropriate equipment for such a purpose. Further, it can be particularly detrimental when inclement weather, such as when snow storms or severe temperature drops accompanied by precipitation, are quickly approaching or ongoing.

Another difficulty is that the compositions resulting from the fermentation or cheese-making processes are often biologically reactive. Thus, if the right conditions are presented, the organisms responsible for fermentation will continue to "grow," even after application. For example, if a first layer of a fermentation byproduct containing yeast or other active cultures is applied to a roadway, and then a second application is made, air becomes entrained between these layers. With the right amount of light, heat, and moisture, the yeast will continue the fermentation process, which will yield strong odors and foam. In certain applications, such as where these compounds are used on roadways in residential neighborhoods, this unpleasant and unsightly mess my be tracked into garages and homes making these compositions totally unacceptable for use.

Finally, a frequent observation is that distillation and fermentation byproducts have an unpleasant odor. The odor is generally described as being similar to that associated with a feed lot on a farm. While this may be acceptable when such byproducts are used on rural highways or aggregate stockpiles in industrial settings, most urban residents are not accustomed to their streets smelling like fermenting silage and would not be willing to accept living with this odor as a trade-off for snow and ice-free roadways.

Thus, a need is identified for an improved anti-freezing and deicing composition that overcomes the above-described limitations of the prior art. The composition would preferably be readily available at a low cost, such as is the case with byproducts of widely used commercial processes, and would be ready for use in conventional devices such as sprayers without any additional mixing or processing. The composition would be non-corrosive and preferably would also inhibit corrosion when mixed with prior art chemical anti-freezing or deicing agents. Overall, the composition would be environmentally friendly and, thus, could be applied without harming plants or contaminating the ground or surface water.

SUMMARY OF THE INVENTION

Accordingly, it is a primary objective of the present invention to provide an anti-freezing and deicing composition. Preferably, the composition is readily available at a low cost, is effective at temperatures well below freezing, is suitable for use in conventional sprayers or like devices without modification or additional processing, and is non-corrosive, biologically inert, and non-offensively smelling.

In preferred embodiments, an important objective of the present invention is to provide an anti-freezing and deicing composition that is readily soluble and miscible with water and other common chemical anti-freezing or deicing agents, such as chloride salts, while retaining the desired anti-freezing and deicing properties.

An additional objective of the present invention is to provide in preferred embodiments an anti-freezing and deicing composition that is effective when admixed with anti-skid agents for use on surfaces such as roadways in anticipation of inclement weather to prevent ice and snow formation and improve traction.

Still a further objective of the present invention is to provide in preferred embodiments an anti-freezing composition that may be applied on aggregate stockpiles in anticipation of low temperatures to keep the aggregate materials from freezing together.

Another important objective of the present invention is to provide in preferred embodiments an anti-freezing and deicing composition that provides residual effects for an extended period of time following an initial application, thereby preventing any significant amount of ice or snow pack from reforming on treated surfaces.

Yet another objective of the present invention is to provide in preferred embodiments an improved method of preventing ice and snow accumulation and/or deicing and cleaning surfaces of accumulated snow and ice in a more convenient, cost effective, reliable and efficient manner.

Additional objectives, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objectives, and in accordance with the purposes of the present invention as described herein, an anti-freezing and deicing composition is disclosed. As will be appreciated from reviewing the description which follows, the composition provides a readily available, low-cost, non-corrosive solution to the problem of both preventing the formation of and removing ice and snow from surfaces, such as roadways, and on other objects, such as aggregate stockpiles. Advantageously, the composition of the present invention overcomes the limitations of prior art proposals by working in conventional sprayers or spreading equipment without the need for either equipment modification or additional mixing or processing, without giving off an unpleasant odor, without being biologically reactive, and without harming the environment. The compositions can be applied to various surfaces including, without limitation, roads, walkways, bridges, and machine surfaces (e.g., an airplane wing or a tractor).

The anti-freezing and deicing composition of the present invention is a waste product of the process used to remove sugar from sugar beet or cane molasses or from other types of molasses (e.g., sorghum or citrus molasses). Normally, this byproduct, which is commonly referred to as "desugared sugar beet molasses" or "desugared sugar cane molasses." More generally, the product formed upon desugaring a molasses is known as "desugared molasses," a solution which used as animal feed or simply discarded after all useful sugar is removed through processes well known in the art and described below. However, it has been discovered that the desugared molasses is highly effective as an anti-freezing and deicing agent that is suitable for use at temperatures well below the freezing point of water, while overcoming many of the disadvantages of prior art anti-freezing or deicing agents. For example, desugared molasses is ready for use in conventional sprayers as delivered from the manufacturer without additional processing. Moreover, the desugared molasses is less prone to biological upset, as it contains no alcohols, or other fermentation byproducts including yeasts and any other microorganisms associated with the fermentation process. Another advantage is that the solution has a non-offensive, light chocolate odor, that makes it acceptable for use in residential settings.

In accordance with another important feature of the proposed anti-freezing and deicing composition of the present invention, the desugared molasses is readily soluble and miscible with other types of known chemical anti-freezing or deicing agents without affecting the basic properties thereof. Examples of such agents include sodium formate, calcium magnesium acetate, potassium acetate, ethylene glycol, di-ethylene glycol, or chloride salts, such as calcium chloride, magnesium chloride, or sodium chloride (preferably in the form of rock salt). As described further below, the desugared molasses in solution improves the deicing properties of these prior art chemical deicers. As a result, lower concentrations of these chemical deicers are effective for their intended purpose. Consequently, the impact of these chemical deicers on the environment and any corrosive effects thereof are advantageously reduced.

It should be appreciated that the use of the term deicing connotes that the desugared molasses is effective to remove ice (by "ice" also including snow) already accumulated on surfaces, such as concrete, pavement, aggregate stockpiles, or the like. However, it must also be appreciated that the desugared molasses is also quite useful to prevent the formation or accumulation of snow or ice. For example, in anticipation of a storm or other type of inclement weather, the desugared molasses can be applied to prevent snow or water from freezing on the roadways. Even if large amounts of snow or ice are deposited on the road, the desugared molasses prevents the ice from sheeting or the snow from becoming packed down, which advantageously allows road crews to remove the accumulation in an expeditious manner. A residual effect is also observed, such that surfaces where the desugared molasses is applied tend to prevent the formation of solid ice or snow pack thereon for an extended period of time following an initial application.

In accordance with preferred embodiments of the invention, a deicing composition is provided (it should be appreciated that the composition also is suitable as an anti-icing composition). The composition includes desugared molasses and a second deicing component, which second component may be a glycol, such as ethylene glycol or di-ethylene glycol, or may be a salt, such as one or more of the sodium, calcium, magnesium, and potassium salts of acetate, chloride, and formate. Other soluble salts may be employed, e.g., soluble potassium salts. The second component may be present in an amount ranging from about 5% to about 80% by dry weight, preferably about 10% to about 60% by dry weight (in the case of a glycol, "dry" meaning weight in the absence of water).

When using the desugared molasses in accordance with the present invention on roadways, it is also possible to admix the desugared molasses with anti-skid materials such as sand or cinders to improve traction. This can be done both when applying the desugared molasses in anticipation of a snow or ice accumulation or when the desugared molasses is used to remove ice or snow that has already accumulated on roadway surfaces or the like.

In accordance with another important aspect of the invention, the desugared molasses composition is non-corrosive and environmentally friendly. Thus, it will not harm vehicles or other outdoor structures fabricated from typically corrosion prone metals, nor will it promote spalling or other damage to concrete or pavement. For instance, through experimentation, it was discovered that when the desugared sugar beet molasses is mixed with typically corrosive anti-freezing and deicing compounds, such as chloride salts, the beet molasses of the present invention actually serves to reduce or eliminate the corrosiveness of the solution.

Still other objects of the present invention will become apparent to those skilled in this art from the following description wherein there is shown and described a preferred embodiment of this invention. As it will be realized, the invention is capable of other different embodiments and its several details are capable of modification in various, obvious aspects all without departing from the invention.

DETAILED DESCRIPTION OF THE INVENTION

The anti-freezing and deicing composition of the present invention is formed using a waste product of the process for removing sugar from sugar beet molasses, also known as desugared sugar beet molasses, or from sugar cane, in which case the product is known as desugared sugar cane molasses. With respect to the former desugared molasses, as is well-known in the art, sugar beets are used to produce commercial grade sugar that serves as a substitute for the often more expensive cane sugar. The older of two most widely used processes of removing sugar from sugar beets involves cleaning the beets and slicing them into thin chips. The sliced beets are then subjected to a sugar extraction process whereby hot water is passed over the beets for approximately one hour. This process removes most, but not all, of the sugar from the beets in the form of beet "juice." The beets are then pressed in screw presses to remove the remaining sugar containing juice therefrom. The juice is then subjected to a process called carbonation, where small clumps of chalk are provided in the juice to filter out any non-sugars. The chalk is then filtered from the juice, which is evaporated to form a syrup. The syrup is then boiled until sugar crystals form therein. Once the crystals form, the resulting mixture is centrifuged to separate the crystals from the remaining liquor. The crystals become commercial grade sugar; the liquor is the desugared sugar beet molasses that forms the anti-freezing and deicing composition of the present invention.

A second, more modem process for obtaining desugared sugar beet molasses, known as the Steffen process, is described in U.S. Pat. No. 5,639,319 to Daly, which proposes the use of desugared sugar beet molasses as a tire ballast. The disclosure of this patent as it relates to the production of desugared sugar beet molasses and the properties and various suppliers thereof is incorporated herein by reference. It should be appreciated that the manner of producing the desugared sugar beet molasses is not critical to the present invention, although it is observed that sugar beet molasses which is a byproduct of the Steffen process generally exhibits slightly better anti-freezing and deicing properties relative to the desugared sugar beet molasses formed using other conventional methods. However, it should be realized that both will generally serve equally well for purposes of the composition of the present invention. With respect to desugared sugar cane molasses, this product may be obtained via any method or process known in the art or otherwise found to be suitable. Other types of molasses may be obtained via any method known in the art or found to be suitable.

Experimentation revealed that the resultant desugared sugar beet molasses from the desugaring process is an excellent anti-freezing and deicing composition that provides several benefits over known compositions previously proposed for this purpose. The desugared molasses is approximately 60 to 80% suspended solids, often 60 to 75% suspended solids. Thus, it can be pumped or sprayed using existing equipment without mixture with additional water or other thinners. Additionally, the desugared sugar beet molasses has a low freezing point and is flowable at low temperatures (approximately 150 cps at −30° F.). This means that it can be sprayed for application at temperatures well below freezing. Desugared cane sugar molasses also has a low freezing point and is flowable at low temperatures, and is also suitable for use in cold climate areas. Thus, the present invention is particularly useful in cold climate areas where the temperature is too low for brine solutions to effectively provide deicing. The molasses is also environmentally friendly, is not biologically reactive, and is both non-corrosive and a corrosion inhibitor.

Another advantage of the invention is that the desugared molasses can be mixed with commercially available chemical anti-freezing or deicing agents without inhibiting the beneficial properties thereof. While higher concentrations are possible, generally the maximum percent by weight of the deicing agents used are: sodium formate 55%, calcium magnesium acetate 50%, potassium acetate 50%, ethylene glycol 70%, di-ethylene glycol 70%, sodium chloride 35%, calcium chloride 45%, magnesium chloride 40% and potassium chloride 42%.

Another useful embodiment of the present invention is a composition comprising between substantially 60 to 80%, preferably about 60% to 75% of solids by weight desugared molasses added at 8 to 10 gallons per ton of rock salt. Water may be added to all embodiments as desired or as necessary to improve spraying performance.

Still a further advantage is that anti-skid agents can be mixed with the molasses to improve roadway traction. Examples of such anti-skid materials include sand, gravel, cinders, limestone aggregate, fly ash, river rock or the like and mixtures thereof. It is contemplated that the application of such a mixture may occur prior to the inclement weather, which allows the solution to not only assist in preventing roadway freeze-overs, but also to improve roadway traction. However, it is within the broadest aspects of the invention for the composition of the present invention to be applied to existing patches of snow or ice to act as a deicing agent.

The composition is applied to a surface in any amount effective for its intended purpose, i.e., as a deicing agent or as an anti-icing agent. The exact amounts applied will be determined by persons of skill in the art, depending on the exact composition chosen. The composition may be "applied" by applying the components separately, such as by first applying salt and then applying desugared sugar beet molasses and optionally other components such as the anti-skid agent.

The typical composition of the desugared sugar beet molasses used in the present invention is as follows (all measurements are approximate):

| Item | Content |
| --- | --- |
| Moisture | 40% |
| Fructose Polymers | 15% |
| Amino Acid Protein Polymers | 12% |
| Other Carbohydrates, Starches and Polymers | 17% |

-continued

| Item | Content |
|---|---|
| Potassium | 9% |
| Sodium | 3% |
| Chlorine | 1% |
| Other Ash/Calcium Oxide | 3% |

Other physical characteristics include:

| | |
|---|---|
| Weight | 10.7 pounds/gallon |
| PH | 9–10 |
| Freezing Point | <−30° F. |
| Boiling Point | 212° F. |
| Viscosity | 150 cps at −30° F. |
| Color | dark brown |
| Odor | chocolate |

The following detailed examples illustrate experiments which demonstrate the improved properties and characteristics of the compositions of the present invention. These examples are provided for purposes of illustration only and are not intended to be limiting.

EXAMPLE 1

On concrete pavement at an ambient temperature of between 16 and 24° F., four different solutions were applied to an accumulation of between ¼ to 1″ of ice and snow. After twenty minutes, the results were as follows:

| Application Rate | Composition | Observations |
|---|---|---|
| 1–2 oz./sq. yd. | Desugared sugar beet molasses alone (60 to 65% solids) | Performed very well; melted snow and ice and continued to move laterally; moved underneath surface of snow |
| 1–2 oz./sq. yd. | 70% desugared sugar beet molasses (60 to 65% solids by weight) mixed with 30% magnesium chloride (30% solids by weight) | Very good results; improved flow and melted more from the top of the ice downward to underneath the surface |
| 2.3–4 oz./sq. yd. | Desugared sugar beet molasses (60 to 65% solids by weight) mixed with rock salt (3 oz. molasses/5 lbs. salt) | Very good results; spread at a fast rate |
| 1–2 oz./sq. yd. | 40% desugared sugar beet molasses (60 to 65% solids by weight) mixed with 50% of a 30% solids by weight magnesium chloride solution and 10% water by volume | Excellent results; no solids formed in solution, which avoided clogging the spray nozzles |

It should also be noted that for several hours prior to application, the above solutions were maintained at the ambient temperature, yet no flow problems were observed using conventional sprayers.

EXAMPLE 2

The corrosiveness of a desugared sugar beet solution was tested by dipping a mild steel nail in the solution for three months. No corrosion on the nail was observed.

EXAMPLE 3

Three ounces of desugared sugar beet molasses having between 60 to 65% suspended solid are mixed in a mixing vessel with 5 lbs of sodium chloride and spread over a surface to remove snow and ice by melting which equates to 9.3 gallons per ton of rock salt.

EXAMPLE 4

A deicing composition is made using 8 gallons of desugared sugar beet molasses per ton of rock salt.

EXAMPLE 5

A solution of desugared cane sugar molasses, 75% by weight, and sodium chloride, 25% by weight, is prepared.

EXAMPLE 6

A deicing solution is made by mixing 1 liter of cane sugar molasses (solids content ranging from 60 to 75%) and 1 liter of a sodium chloride brine (23% dry salt).

The foregoing description of the anti-freezing and deicing composition of the present invention has been presented for purposes of illustration and description. It is not intended to be exhaustive or to limit the invention to the precise form disclosed. For example, the desugared sugar beet molasses doesn't need to be mixed with the deicer component or anti-skid agent prior to application to the surface being treated. The desugared sugar beet molasses may be applied to the surface separately either before or after treatment of that surface with a deicer and/or anti-skid agent of a type known in the art.

All references cited herein and also U.S. Pat. No. 6,080,330 are hereby incorporated by reference in their entireties.

What is claimed is:

1. A deicing composition comprising at least 20% by weight of desugared molasses and a second deicing component, said second deicing component being selected from the group consisting of ethylene glycol, di-ethylene glycol, soluble potassium salts, and the sodium, calcium, magnesium, and potassium salts of acetate, chloride, carbonate, and formate.

2. A deicing composition according to claim 1, said desugared molasses comprising desugared sugar cane molasses.

3. A deicing composition according to claim 1, said desugared molasses having from about 60 to 75% solids.

4. A deicing composition according to claim 1, said second component being present in said composition in an amount ranging from about 5% to about 80% by dry weight.

5. A deicing composition according to claim 4, said second component being present in said composition in an amount ranging from about 10% to about 60% by dry weight.

6. A deicing composition according to claim 4, said second component being sodium chloride.

7. A deicing composition according to claim 6, said desugared molasses comprising desugared sugar cane molasses.

8. A composition according to claim 1, further including an anti-skid agent, said anti-skid agent being present in an amount effective to retard skidding when said composition is applied to a surface.

9. A composition according to claim 7, said anti-skid agent being selected from the group consisting of sand, gravel, cinder, limestone aggregate, fire ash, river rock, and mixtures thereof.

10. A composition according to claim 8, said anti-skid agent being sand.

11. A composition for deicing or inhibiting the formation of ice and snow on surfaces comprising a mixture of desugared sugar cane molasses and rock salt and including from 8 to 10 gallons of desugared sugar cane molasses per ton of rock salt.

12. A method for forming a deicing composition, comprising providing a desugared molasses, and mixing said desugared molasses with water and a salt, said salt being selected from the group consisting of the soluble potassium salts and the sodium, calcium, magnesium, and potassium salts of acetate, chloride, and formate.

13. A method according to claim 11, said desugared molasses comprising desugared sugar cane molasses.

14. A method according to claim 13, said salt comprising sodium chloride.

15. A method for deicing an icy surface, comprising applying to said icy surface a deicing composition in an amount effective to reduce the level of ice on said surface, said composition comprising at least 20% by weight of desugared molasses and a second deicing component, said second deicing component being selected from the group consisting of ethylene glycol, di-ethylene glycol, soluble potassium salts, and the sodium, calcium, magnesium, and potassium salts of acetate, chloride, and formate.

16. A method according to claim 15, said desugared molasses comprising desugared sugar cane molasses.

17. A method according to claim 15, said desugared molasses having from about 60 to 75% solids.

18. A method according to claim 15, said second component being present in said composition in an amount ranging from about 5% to about 80% by dry weight.

19. A method according to claim 18, said second component being present in an amount ranging from about 10% to about 60% by dry weight.

20. A method according to claim 15, said second component being sodium chloride.

21. A method according to claim 15, said desugared molasses being desugared sugar cane molasses.

22. A method according to claim 15, said composition further including an anti-skid agent, said anti-skid agent being present in an amount effective to retard skidding when said composition is applied to a surface.

23. A method according to claim 22, said anti-skid agent being selected from the group consisting of sand, gravel, cinder, limestone aggregate, fire ash, river rock, and mixtures thereof.

24. A method according to claim 23, said anti-skid agent being sand.

25. A method for deicing an icy surface, comprising apply to said icy surface a deicing composition, said deicing composition comprising a mixture of desugared sugar cane molasses and rock salt and including from 8 to 10 gallons of desugared sugar cane molasses per ton of rock salt.

26. A method for inhibiting the formation of ice on a surface, comprising applying to said surface an amount of an anti-icing composition effective to retard the formation of ice on said surface, said composition comprising at least 20% by weight of desugared molasses and a second deicing component, said second deicing component being selected from the group consisting of ethylene glycol, di-ethylene glycol, soluble potassium salts, and the sodium, calcium, magnesium, and potassium salts of acetate, chloride, and formate.

27. A method according to claim 26, said desugared molasses comprising desugared sugar cane molasses.

28. A method according to claim 26, said desugared molasses having from about 60 to 75% solids.

29. A method according to claim 26, said second component being present in said composition in an amount ranging from about 5% to about 80% by dry weight.

30. A method according to claim 29, said second component being present in an amount ranging from about 10% to about 60% by dry weight.

31. A method according to claim 26, said second component being sodium chloride.

32. A method according to claim 26, said desugared molasses being desugared sugar cane molasses.

33. A method according to claim 26, said composition further including an anti-skid agent, said anti-skid agent being present in an amount effective to retard skidding when said composition is applied to a surface.

34. A method according to claim 33, said anti-skid agent being selected from the group consisting of sand, gravel, cinder, limestone aggregate, fire ash, river rock, and mixtures thereof.

35. A method according to claim 34, said anti-skid agent being sand.

36. A method for inhibiting the formation of ice on a surface, comprising applying to said surface an anti-icing composition, said anti-icing composition comprising a mixture of desugared sugar cane molasses and rock salt and including from 8 to 10 gallons of desugared sugar cane molasses per ton of rock salt.

37. A method for deicing an icy surface, comprising applying to said icy surface an amount of a deicing agent effective to reduce the level of ice on said surface, said deicing agent comprising desugared cane sugar molasses.

38. A method according to claim 36, said surface being selected from the group consisting of a road, a walkway, and a machine surface.

\* \* \* \* \*

(12) INTER PARTES REEXAMINATION CERTIFICATE (1617th)
United States Patent
Bloomer

(10) Number: US 6,416,684 C1
(45) Certificate Issued: *Aug. 20, 2019

(54) ANTI-FREEZING AND DEICING COMPOSITION AND METHOD

(75) Inventor: Todd A. Bloomer, Georgetown, KY (US)

(73) Assignee: Natural Alternatives, LLC

Reexamination Request:
 No. 95/001,136, Jan. 23, 2009

Reexamination Certificate for:
 Patent No.: 6,416,684
 Issued: Jul. 9, 2002
 Appl. No.: 09/892,106
 Filed: Jun. 26, 2001

(*) Notice: This patent is subject to a terminal disclaimer.

(51) Int. Cl.
 *C09K 3/18* (2006.01)
(52) U.S. Cl.
 CPC .................... *C09K 3/185* (2013.01)
(58) Field of Classification Search
 None
 See application file for complete search history.

(56) References Cited

To view the complete listing of prior art documents cited during the proceeding for Reexamination Control Number 95/001,136, please refer to the USPTO's public Patent Application Information Retrieval (PAIR) system under the Display References tab.

*Primary Examiner* — Jerry D Johnson

(57) ABSTRACT

A composition is proposed for use in preventing the formation of ice or snow on outdoor surfaces, such as roadways or aggregate stockpiles, and also for deicing surfaces upon which snow or ice has formed. The composition is formed from a waste product of the process of removing sugar from molasses, also known as desugared molasses. As a byproduct of a widely used process for making edible sugar, the desugared molasses is readily available at a low cost. Moreover, the composition is ready for use in conventional spraying equipment without the need for mixing agents, is environmentally friendly, and is able to perform at temperatures well below the freezing point of water. The composition is also non-corrosive and can be admixed with chloride salts, such as magnesium, calcium, or sodium chloride, to reduce the corrosiveness of the resulting solution while still providing effective deicing activity.

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-38 are cancelled.

New claims 39-66 are added and determined to be patentable.

39. *A method for forming a deicing composition, comprising providing a desugared molasses, and glycol, di-ethylene glycol, soluble potassium salts, and the sodium, calcium, magnesium, and potassium salts of acetate, chloride, and formate.*

40. *The deicing composition according to claim 46, wherein the second deicing component is selected from the group consisting of ethylene glycol, di-ethylene glycol, the sodium, calcium, magnesium, and potassium salts of chloride and carbonate, and the calcium and magnesium salts of acetate and formate.*

41. *The deicing composition of claim 62, wherein the second deicing component is sodium chloride.*

42. *The deicing composition of claim 50, wherein the second deicing component is selected from the group consisting of calcium carbonate or magnesium carbonate.*

43. *A deicing composition comprising 75% by weight desugared cane molasses and 25% by weight sodium chloride.*

44. *The deicing composition of claim 1, wherein the desugared molasses comprises 18% by weight carbohydrates.*

45. *The deicing composition of claim 106, wherein the desugared molasses further comprises 15% by weight sugars.*

46. *The deicing composition of claim 39, wherein the desugared molasses comprises 18% by weight carbohydrates.*

47. *The deicing composition of claim 108, wherein the desugared molasses further comprises 15% by weight sugars.*

48. *The deicing composition of claim 1, wherein the desugared molasses comprises 15% fructose polymers and 17% other carbohydrates, starches and polymers.*

49. *The deicing composition of claim 39, wherein the desugared molasses comprises 15% fructose polymers and 17% other carbohydrates, starches and polymers.*

50. *The deicing composition of claim 1, wherein the desugared molasses is derived from a non-fermentation source.*

51. *The method of claim 15, wherein the desugared molasses is derived from a non-fermentation source.*

52. *The deicing composition of claim 46, wherein the desugared molasses is derived from a non-fermentation source.*

53. *The method of claim 47, wherein the desugared molasses is derived from a non-fermentation source.*

54. *The method of claim 51, wherein the desugared molasses is derived from a non-fermentation source.*

55. *A deicing composition comprising 70% by weight of desugared molasses and 30% by weight of a second component comprising magnesium chloride.*

56. *The deicing composition of claim 117, wherein the second component comprises 30% solids by weight magnesium chloride.*

57. *The deicing composition of claim 121, wherein said desugared molasses is derived from the Steffen process.*

58. *A deicing composition comprising between 40 and 70% by weight of desugared molasses, said desugared molasses derived from the Steffen process, and a second deicing component, said second deicing component being selected from a group consisting of the sodium, calcium, magnesium and potassium salts of chloride and carbonate, and the calcium and magnesium salts of acetate and formate.*

59. *The deicing composition of claim 123, wherein the deicing composition comprises 70% by weight of desugared molasses.*

60. *The deicing composition of claim 124, wherein the second deicing component is magnesium chloride.*

61. *A method for deicing at least part of an aggregate stockpile, comprising applying to said aggregate stockpile a deicing composition in an amount effective to reduce the level of ice on said aggregate stockpile, said composition comprising at least 20% by weight of desugared molasses, said desugared molasses derived from the Steffen process, and a second deicing component, said second deicing component being selected from the group consisting of the sodium, calcium, magnesium, and potassium salts of acetate, and formate.*

62. *The method of claim 126, where in the aggregate stockpile comprises coal.*

63. *The method of claim 127, wherein the second deicing component is selected from the group consisting of the calcium and magnesium salts of acetate and formate.*

64. *A method for preventing the formation of ice on an outdoor surface without any ice, comprising applying to said outdoor surface a deicing composition in an amount effective to retard the formation of ice on said surface, said composition comprising at least 20% by weight of desugared molasses, said desugared molasses derived from the Steffen process, and a second deicing component, said second deicing component being selected from the group consisting of soluble potassium salts, and the sodium, calcium, magnesium, and potassium salts of acetate, and formate.*

65. *The method of claim 129, further including the step of deriving the desugared molasses from molasses via the Steffen process.*

66. *The method of claim 130, wherein the outdoor surface comprises coal.*

\* \* \* \* \*